Dec. 12, 1944.                L. S. WILLIAMS                2,364,837
                              WEIGHING SCALE
                           Filed Dec. 4, 1941          5 Sheets-Sheet 1
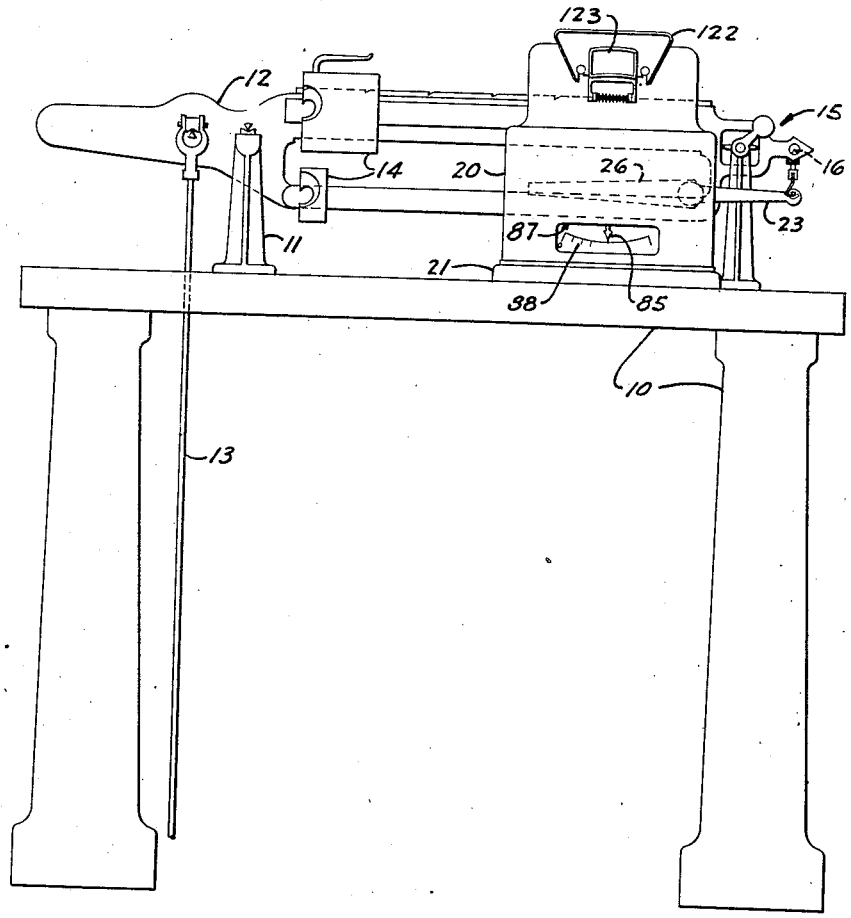
Fig. I
Lawrence S. Williams
INVENTOR
BY Marshall & Marshall
ATTORNEYS

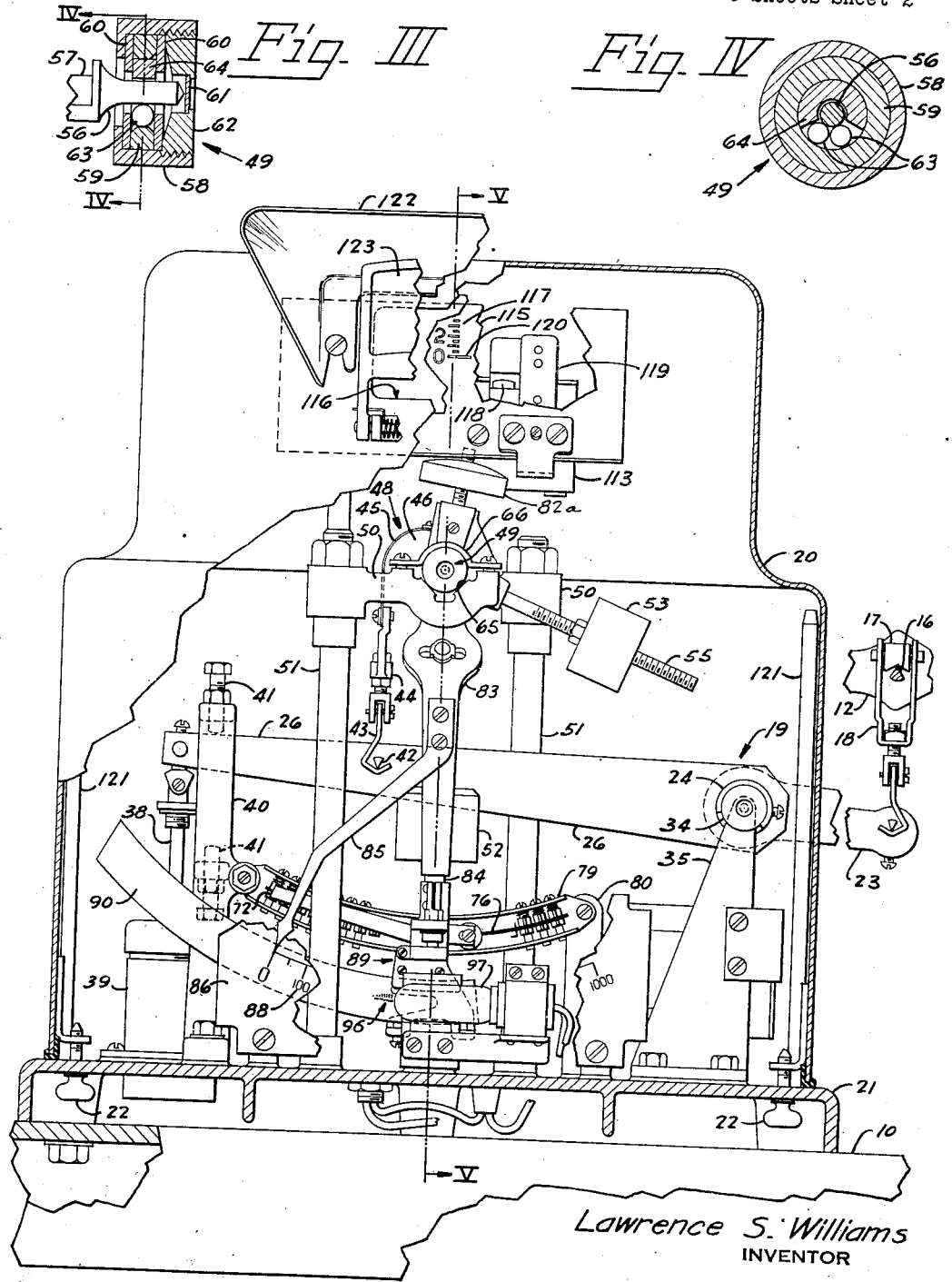

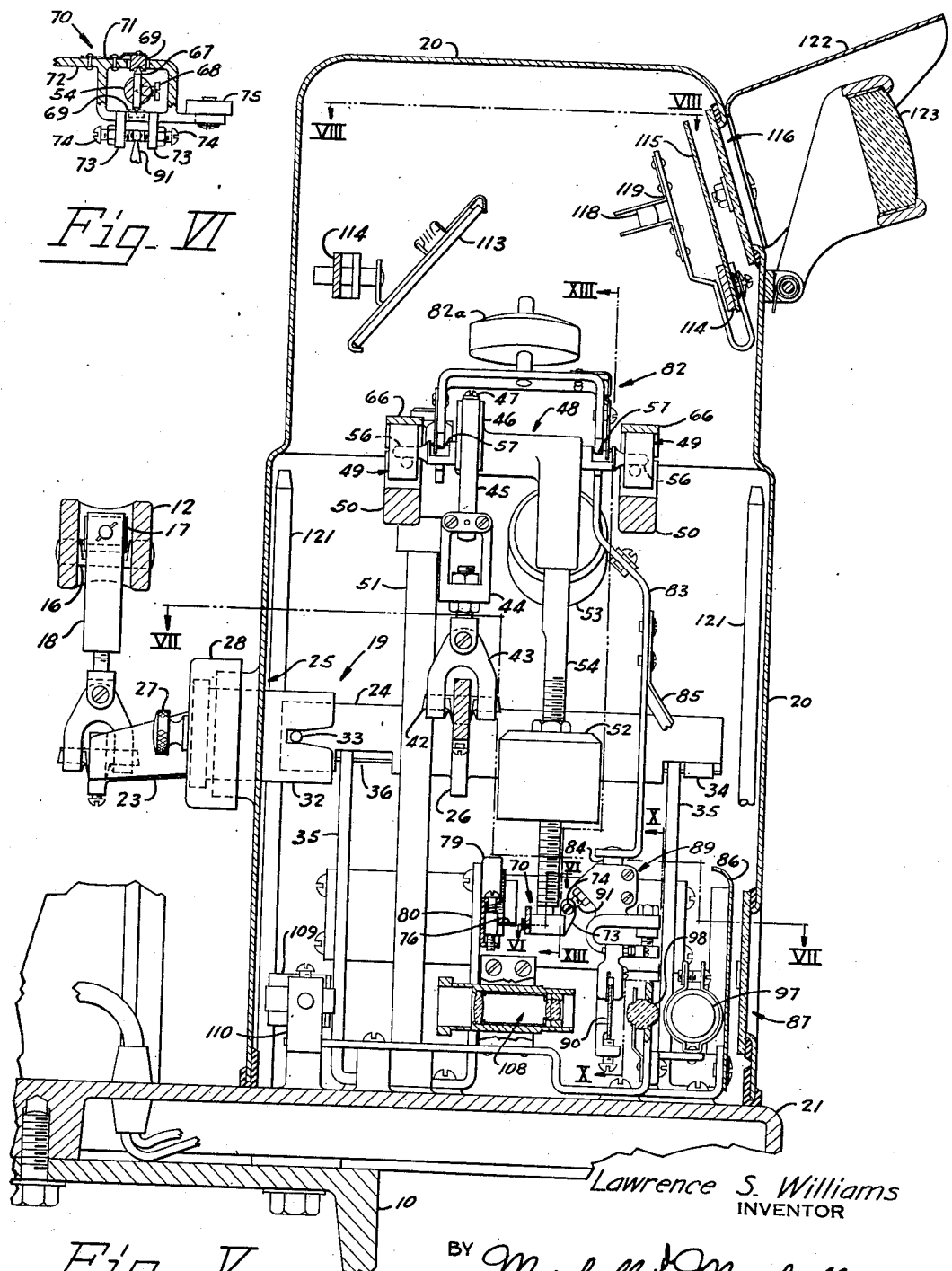

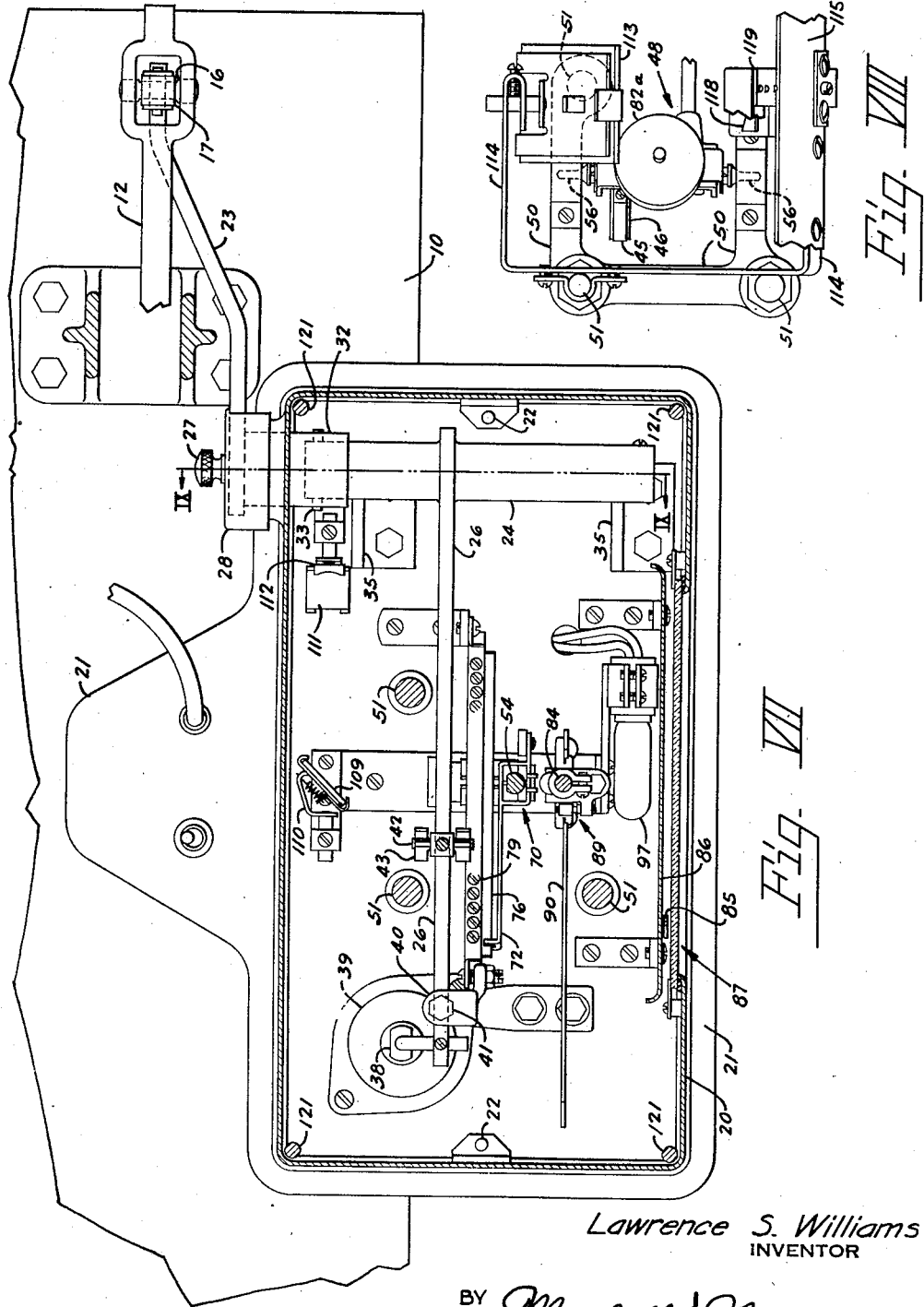

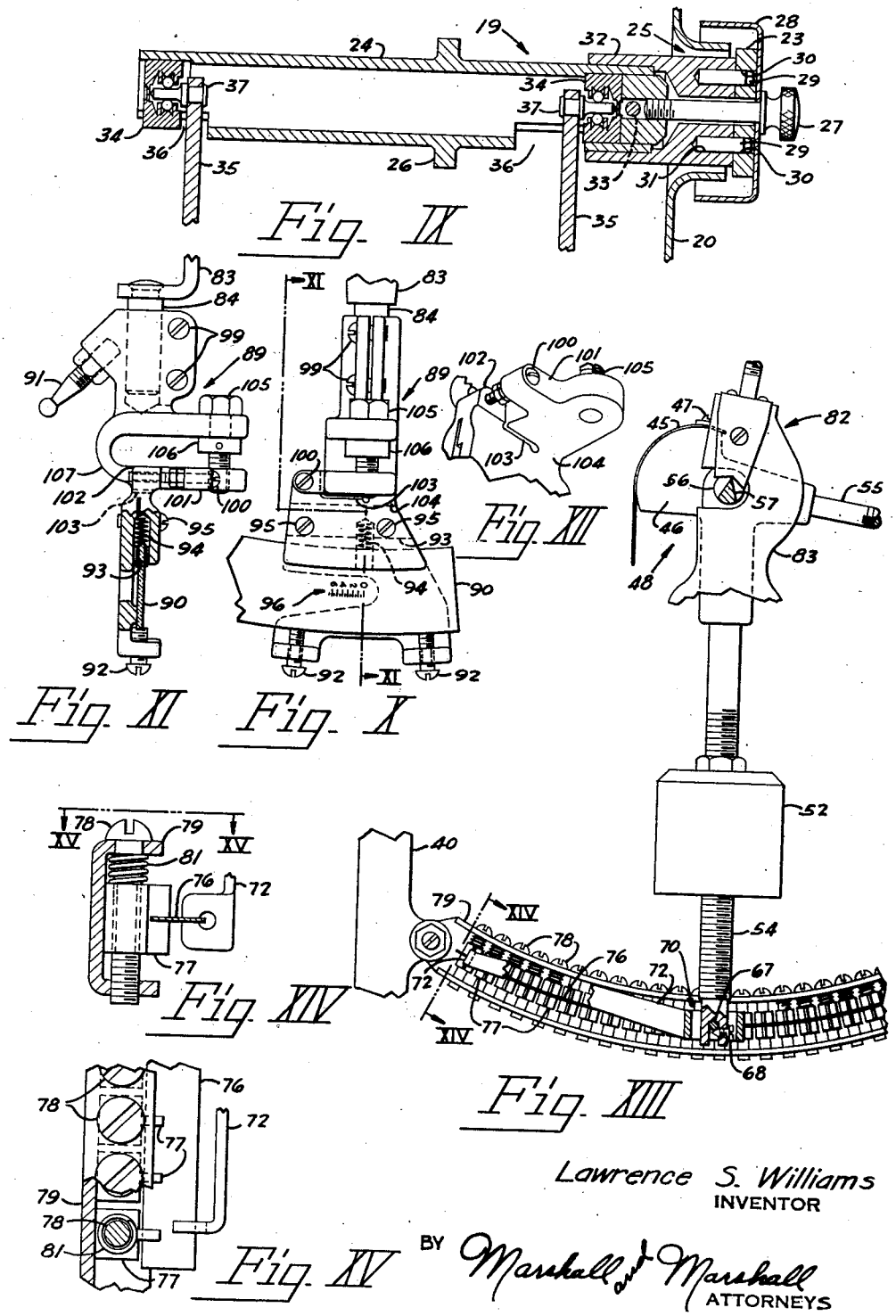

Patented Dec. 12, 1944

2,364,837

UNITED STATES PATENT OFFICE 2,364,837

WEIGHING SCALE

Lawrence S. Williams, Toledo, Ohio, assignor to Toledo Scale Company, Toledo, Ohio, a corporation of New Jersey Application December 4, 1941, Serial No. 421,629

6 Claims. (Cl. 88—24)

This invention relates to weighing scales, and more particularly to weighing scales which project a greatly magnified image of a transparent chart onto a screen to indicate weights of loads placed upon the scale.

The purpose of this type of scale is to provide large legible indicia which cover a wide range in magnitude of weight without requiring such large movable charts or long movement of an indicator as would be required to show a comparably large number of indicia on scales of more conventional types, such as, dial, fan, or cylinder scales. Thus, a projecting scale overcomes one of the major difficulties with other types of scales which is the provision of sufficient indicia to indicate relatively minor changes in the weights of loads on the scale and yet to cover a sufficiently large range to indicate the weights of greatly varying loads placed on the scale.

In a weighing scale the indicating mechanism must be kept light enough in mass so that its movement will exert no force on the scale mechanism and thus cause inaccuracy in the scale. Similarly, although indicia may be spread on a large chart, the size of the chart is limited by the distance through which a weighing scale is able to move an indicator. In a projecting scale, the actual chart moved by the scale itself may be very small and thus will exert no incorrect force on the scale and yet the projected image of the chart will be of sufficient size to show many more indicia than could be shown by any other method.

In projecting scales, of course, due to the extreme magnification of the movement of the chart, the scale mechanism must be sufficiently sensitive so that the benefits to be derived from the greatly enlarged image will not be overcome by inaccuracies therein resulting from inaccuracies in the scale mechanism. The very reduction in size of the movable portion of the indicating mechanism and the elimination of racks and pinions, by the elimination of movable indicators, is a long step toward eliminating a source of much inaccuracy in the conventional weighing scale; but this again requires that the projecting scale be accurately and carefully constructed.

In any projecting system, and particularly so in one such as is employed in a projecting scale where the purposes are to greatly magnify minute indicia to afford legibility, the transparency through which the light passes must be kept normal to the beam and in focus, and the indicia thereon must be kept in line with the beam so that the projected image will be bright, clear, sharp and easily and accurately readable.

Some projecting scales, or other type of projecting measuring instruments, have screens which are mounted in frames and held in place by molding compositions, such as putty, in which they may be correctly positioned while the composition is soft and then, when the material hardens, are permanently secured to the frame. The objection to this type of mounting is twofold. First, it adds weight to the mechanism which may diminish its accuracy and, second, compositions of such type do not retain their size and form but shrink and expand which is very likely to cause warpage of the transparent scale, to force it out of position or even to break it.

If any of these changes take place the result is to cause the scale to give a blurred or fuzzy indication or one which is too poorly illuminated to be easily read and may necessitate the removal of the transparent chart and its replacement or reassembly in the scale. Such reassembly and realignment may be very difficult and may cause a long delay or period of inoperativeness while being done.

It is an object of this invention to provide a projecting scale for indicating the weight of loads placed on such scale in clearly legible projected indications.

It is another object of this invention to provide a projecting scale having a transparent chart the alignment and position of which can easily be adjusted and changed if necessary.

A further object of this invention is to provide a mounting for the transparent chart of a projection measuring instrument which can be adjusted to change the position of such chart in one direction or in one plane without affecting its position or adjustment in another direction or plane.

More specific objects and advantages are apparent from the description, in which reference is had to the accompanying drawings illustrating a preferred form of scale embodying the invention.

In the drawings:

Fig. I is a view in elevation of a conventional weighing scale associated with a device embodying the invention.

Fig. II is a view in elevation, greatly enlarged, of a projecting scale embodying the invention, certain parts being broken away and certain parts being shown in section.

Fig. III is a greatly enlarged fragmentary sectional view of a pivotal mounting for an oscillating portion of the device shown in Fig. II.

Fig. IV is a vertical sectional view taken on the line IV—IV of Fig. III.

Fig. V is a vertical sectional view taken on the line V—V of Fig. II.

Fig. VI is an enlarged fragmentary view, partly in section, taken on the line VI—VI of Fig. V.

Fig. VII is a horizontal sectional view taken substantially on the line VII—VII of Fig. V.

Fig. VIII is a fragmentary plan view taken from the position indicated by the line VIII—VIII of Fig. V.

Fig. IX is a vertical sectional view taken on the line IX—IX of Fig. VII.

Fig. X is a fragmentary view in elevation on an enlarged scale taken from the position indicated by the line X—X of Fig. V.

Fig. XI is a fragmentary view, partly in section, taken on the line XI—XI of Fig. X.

Fig. XII is a fragmentary view in perspective of a portion of the mechanism illustrated in Figures X and XI.

Fig. XIII is a fragmentary view in elevation taken from the position indicated by the line XIII—XIII in Fig. V.

Fig. XIV is a greatly enlarged detail view taken on the line XIV—XIV of Fig. XIII.

Fig. XV is a fragmentary view taken from the position indicated by the line XV—XV of Fig. XIV.

These specific drawings and the specific description that follows merely disclose and illustrate the invention and are not intended to impose limitations upon the claims.

Mounted on a main stand 10 in a fulcrum bracket 11 is a weighing scale beam 12 which is connected to the load receiving portion of the scale (not shown) by means of a steelyard rod 13 having a bearing in its upper end which rides on the load pivot of the beam 12. The beam 12 has poises 14 and a trig and locking loop 15 for counterbalancing tare weight and indicating balance. A pivot 16, mounted in the nose end of of the beam 12, supports a bearing 17 (Fig. II) which is mounted in the upper end of a link 18, the lower end of which is pivotally connected to one end of a main lever 19 extending from a housing 20 of the projecting scale. The housing 20 is attached to a base 21, by means of thumb screws 22, and the base 21 is mounted on the stand 10.

The lever 19 consists of an outwardly extending arm 23 (Fig. V) which is removably attached to the end of a pipe body 24 projecting through an opening 25 in the rear of the housing 20, the pipe body 24, and a second arm 26 which is integrally constructed with the body 24 and extends horizontally therefrom in the opposite direction from the arm 23 (Fig. VII). The arm 23 of the lever 19 may be detached therefrom by unscrewing a thumb screw 27 (see also Fig. IX) removing a cap 28 and taking the arm 23 off pins 29. The pins 29 snugly fit into holes 30 bored through the end of the arm 23 in radially spaced parallel relationship and are driven into similarly bored holes 31 in a sleeve 32 which slides over and around the pipe body 24 engaging studs 33 which project from the pipe body 24 in slots in the wall of the sleeve 32. By means of the pins 29, the arm 23 may be mounted on the pipe body 24 in the position shown in the drawings, or it may be rotated with respect to the body 24 to vary the angular relationship between the arms 23 and 26 so that the arm 26 can remain horizontal and the arm 23 be connected to various types of weighing scales to permit the housing 20 to be located above, below or to either side of the connection point with the weighing scale. The pipe body 24 is rigidly connected to the arm 23 when they are assembled, by means of the pins 29 and the studs 33 engaged in the sleeve 32. The pipe body 24 is mounted for rockable movement on its axis on ball bearings 34 (Fig. IX) which are fitted into the interior of the pipe body 24. Brackets 35 extend upwardly from the base 21 of the scale through slots 36 in the wall of the pipe body 24 and have at their upper ends horizontal axles 37 on which the bearings 34 rotate.

The arm 26 extends horizontally within the housing 20 and has attached to its furthermost end a plunger rod 38 which extends downwardly into a motion damping dashpot 39. A bracket 40 (Figs. II and VII) is located just to one side of the end of the arm 26 and has adjustable stops 41 to limit the angular movement of the arm 26. A pivot 42, mounted in the arm 26, is engaged by a bearing yoke 43 which is connected, by means of a link 44, to the lower end of a metallic ribbon 45 which overlies the curved surface of a sector-like cam 46 to which the ribbon is fixedly attached by means of a screw clamp 47. The sector-like cam 46 is an integral part of a pendulum body 48 which is pivotally mounted in bearings 49 located in a cross bracket 50 (see also Fig. V) supported by frame members 51. The pendulum body 48 also includes two pendulum weights 52 and 53 which are adjustably mounted on stems 54 and 55 extending radially from the pendulum body 48. The weights 52 and 53 can be moved radially with respect to the axis of the pendulum body 48 to vary their load counterbalancing ability. The pendulum body 48 is mounted in the bearings 49 by means of axles 56 which extend horizontally from the pendulum body 48 and have sharp knife edges 57 cut in their upper surfaces. The outermost ends of the portions of the axles 56 which extend into the bearings 49 are turned down to a smaller diameter and have points at their very ends (Fig. III). Each of the bearings 49 consists of a housing 58 in which an outer race 59, side wall member 60 and a thrust receiving disk 61 are clamped by a retaining nut 62 threaded into the housing 58. The pointed end of the axle 56 bears against the disk 61. Two balls 63 are located within the race and between the two opposing faces of a C shaped member 64. The two opposing faces of the member 64 embrace an angle of only a sufficient number of degrees to leave open a space within the race wide enough to permit the balls to travel back and forth on the inner surface of the race 59 under the rocking motion of the axle 56. The bearings 49 are clamped into substantially V shaped seats 65 in the cross bracket 50 by clamps 66 (Fig. II).

The lower end of the pendulum stem 54 is bifurcated (Figures VI and XIII) and has a double pointed pin 67 held between the bifurcations by a pointed set screw 68 which is screwed into the stem 54 through one of the bifurcations thereof. The pin 67 is mounted in conical bearings 69 in the body of a bell crank 70 for which the pin 67 serves as an axle. One of the bearings 69 is resiliently mounted in the bell crank 70 by means of a spring-like member 71 riveted to the bell crank 70 (Fig. VI). The bell crank 70 has one long substantially horizontal arm 72 which extends along the vertical plane of movement of the pendulum stem 54. The other arm of the bell crank 70 consists of two ears 73 through which are threaded horizontal screws 74 having concave depressions in their innermost ends. The screws 74 may be adjustably positioned in the ears 73 with relation to each other. A counterweight 75 is mounted on the bell crank 70 to counterbalance the weight of the arm 72.

The end of the arm 72 (Figs. XIII, XIV, XV) is turned at right angles to the body and split, the bifurcations straddlingly engaging an arcuate ribbon 76 which is fastened in blocks 77 through each of which there extends a screw 78 which is also threaded through the two arms of a substantially U shaped arcuate channel member 79. One end of the channel member 79 is supported in the bracket 40 and the other end is attached to a bracket 80 fastened to the base 21. Around each of the screws 78, between the upper arm of the U shaped channel member 79 and the block 77, is a spring 81 which works against the screw 78 to hold the block 77 in its adjusted position. As the pendulum body 48 pivots in the bearings 49 and oscillates the pendulum stem 54, the arm 72 of the bell crank 70 slides along the ribbon 76.

An inverted L shaped member 82 (Fig. V) is mounted on the knife edges 57 of the axles 56 and its long arm 83 extends downwardly, substantially parallel to the pendulum stem 54. A weight 82a is attached to the upper part of the member 82 to balance the weight of the arm 83. The lower end of the arm 83 (Fig. XI) is turned horizontally and has fastened thereto a vertically extending stud 84. An indicator 85 is attached to the arm 83 (Figures II and V) and sweeps over a vertically disposed chart 86 which is located just within the front wall of the housing 20 and visible through an opening 87 therein. Arcuately arranged indicia 88 located on the chart 86 cooperate with the indicator 85 to indicate approximate weight and approach to correct weight.

A clamping member 89 embraces the stud 84 (Figures X and XI) extending downwardly from the arm 83 and supporting an arcuate transparent chart 90. The chart 90 is disposed (Figures II and V) for movement in a vertical plane parallel to those in which the pendulum stem 54 and arm 83 move. A ball ended stud 91 (Fig. XI) is screwed into the body of the member 89 extending rearwardly therefrom, the ball portion being loosely embraced by the two concave ended screws 74 (Fig. VI) thus forming an operative connection between the arm 83 and the short arm of the bell crank 70.

The chart 90 (Figures X and XI) is held in the clamping member 89 by means of two screws 92 which bear on its edge of greater radius and force its other edge upwardly into a groove 93 in the member 89, against the action of a spring 94 located in a bore in the member 89 and by the clamping action of two screws 95 which compress the chart 90 between the two sides of the groove 93.

The chart 90 is substantially arcuate in shape and transparent indicia 96 are radially arranged thereon in relation to the pivotal point of the chart carrying arm 83. A lamp 97 and condensing lens 98 (Fig. V) are located with their center axes on a horizontal line intersecting the circumference of a circle of which the outer edges of the indicia 96 form an arc and at right angles to a plane lying on such circle. The lamp and lens are located on the same side of the vertical plane of movement of the chart 90, near the front of the housing 20.

To project a perfect image, the chart 90 must be so positioned with respect to the beam of light emanating from the lamp 97 and condensed by the lens 98 that the indicia 96 are always in proper focus and normal to the beam of light. The clamping member 89 is, therefore, adjustable in the following ways. It is slidably adjustable on the stud 84, by loosening screws 99, to raise or lower the chart 90 relatively great distances. Smaller vertical changes in position can be made by tightening or loosening the two screws 92 simultaneously. The two screws 92, when the screws 95 are loosened, may be moved in opposite directions relative to each other to adjust the concentricity of the arcuate chart 90 with respect to the pivot point of the arm 83. Wide horizontal angular adjustment of the chart 90 relative to a plane at right angles to the beam of light emanating from the lamp 97 and lens 98 is accomplished by turning the member 89 on the stud 84. Finer adjustment of the position of the chart 90 in the same respect may be made by turning a screw 100 which extends between two ears 101 and 102 integral with the body of the member 89. The member 89 has a substantially U shaped portion which extends horizontally. The chart-carrying portion of the member 89, its lower section, is partially separated from the center U shaped portion by a groove 103 which lies between the ear 102 and the lower arm of the U shaped portion and extends hroizontally almost across the portion of the member 89 connecting the lower arm of the U shaped portion to the lower chart-carrying portion. The ear 101 is integral with the lower arm of the U shaped portion. Thus turning the screw 100 moves the ears 101 and 102 relative to each other and twists the connecting portion 104 of the member 89 to slightly swivel the chart 90 with respect to the center line of the stud 84. A stud 105 passes vertically through the upper arm of the U shaped portion and is threaded into the lower arm thereof. A collar 106 is pinned around the stud 105 just below the upper arm of the U shaped portion. Turning the stud 105 in one direction draws the two arms of the U toward each other and turning it in the other direction forces the two arms apart, the collar 106 acting as a thrust against the upper arm. The cross or body portion 107 of the U acts as a flexure plate and its tension holds the two arms of the U in the position to which they are forced by the action of the stud 105. This adjustment varies the vertical angular position of the chart 90 with respect to its plane of movement.

The position of the clamping member 89 on the stud 84 may be adjusted and then firmly fixed at the time of original assembly of the scale. Any slight further adjustments which may be necessary in use, or to correct later visible faults in construction of the chart 90, may easily be made by adjusting the screws 92, screw 100 or stud 105.

Projecting lenses 108 (Fig. V) are mounted coaxially with the lamp 97 and condensing lens 98 but on the other side of the chart 90 therefrom and thus project an image of that one of the indicia 96 which is positioned in the ray of light under the load on the scale. A mirror 109, mounted in a bracket 110 fastened to the base 21 (Figs. V and VII), reflects the image horizontally at right angles to its incident direction where it strikes a second mirror 111 which is mounted on a bracket 112 fastened to the base 21 near one side of the housing 20. The mirror 111 reflects the image upwardly through the housing 20 where it strikes a third mirror 113 adjustably supported in a bracket 114 which is clamped to an extension of one of the frame members 51 (Fig. VIII). The mirror 113 is located in the upper rear corner of the housing 20 and reflects the light beams and image carried thereby toward the front of the housing 20 where they fall on a translucent screen 115 (Fig. V) located immediately behind a windowed opening 116 in the front of the housing 20 to form an image 117 (Fig. II) of the indicia 96 on the screen 115.

A combination prism and lens 118 (Fig. V and VIII) is mounted in a clamp 119 fastened to the bracket 114 and is located in the path, between the mirror 113 and the screen 115 of a ray of light projected and reflected by the system just described, which passes through a transparent arc-like area in the chart 90 extending along, and just removed from, the peripheral edge of the indicia 96. Because of the characteristics of the projecting lenses 108, this ray is divergent with respect to the light carrying the projected image of the indicia 96 and, therefore, strikes the combination prism and lens 118 which bends it in a substantially horizontal plane to swing it over adjacent to the image of the indicia 96 and focuses it in a plane at right angles thereto to form a thin indicating index 120 (Fig. II) on the screen 115.

When the pendulum arm 54 is swung by a load placed on the scale, the arm 83, because of the connection between the ball-ended pin 91 and the bell crank 70, is swung therewith. The arm 72 of the bell crank 70 slides along the ribbon 76. If there is an error in the mechanism, a fault in the chart 90, incorrectly spaced indicia 96, or other reason of like nature, the position of the chart 90 is not proper to line up the correct one of the indicia 96 with the light beam passing through the chart 90 to correctly indicate the weight of the load on the scale. This may be corrected by turning that one of the screws 78 which passes through the block 77 holding that portion of the ribbon 76 which is then straddled by the arm 72. The ribbon 76 is deformed at this point, which swings the arm 72 up or down, turning the bell crank 70 and swinging the arm 83 on the knife edges 57 behind or ahead of the position of the pendulum stem 54. This moves the chart 90 the proper distance to display the correct one of the indicia 96. A correction so made does not affect the operation of the scale at any other point and remains correct because the position of the arm 83 is always influenced the same amount when the arm 72 of the bell crank 70 passes over the deformed portion of the ribbon 76.

Four vertically extending rods 121 are located one at each corner of the base 21 to serve as guides for the housing 20 when it is removed or replaced to prevent its striking any of the mechanism.

A canopy 122 (Figs. I, II and V) is attached to the exterior of the housing 20 above and around the opening 116 to shade the screen 115 from reflected light. A magnifying lens 123 is pivotally attached to the housing 20 and may be swung up in front of the opening 116 to further magnify the projected image 117 of the chart 90.

The embodiment of the invention which has been disclosed may be modified to meet various requirements.

Having described the invention, I claim:

1. In a projecting value measuring instrument, a condition responsive element, a transparent indicia-bearing member, means for mounting said member on said element, a projection system comprising a lamp, lenses, mirrors and a screen for receiving images, said member being movable through the light emanating from said lamp whereby an image of the transparent indicia borne by said member corresponding to the magnitude of the condition to which said element is responsive is projected onto said screen, the mounting means for said member including means for deforming said mounting means in two planes at right angles to each other for positioning said member normal to such light emanating from said lamp.

2. A mounting bracket for the transparent indicia-bearing member of a projecting value measuring instrument comprising means for adjustably clamping said member in said bracket for positioning said member so that all such indicia pass through the same point when said member is moved in response to changes in the value of the conditions under measurement, means for adjustably deforming a portion of said bracket for varying the horizontal angular relationship between said member and its plane of movement and means for adjustably deforming a second portion of said bracket for varying the vertical angular relationship between said member and such plane.

3. In a weighing scale, in combination, load counterbalancing mechanism including a load responsive member, a transparent indicia-bearing chart, means for projecting an image of said chart to indicate the value of loads on said scale and means for mounting said chart on said member, the last named means comprising a bracket having adjustably deformable portions in two planes at right angles to each other and means for adjustably deforming portions of the bracket to vary the angular relationship of the chart in the projection plane.

4. In a projecting weighing attachment, in combination, automatic load counterbalancing mechanism including a pivotally mounted load responsive member, an arcuate transparent indicia-bearing chart, a mounting for said chart attached to said member, and a projection system including a screen for projecting an image of said chart onto said screen, said chart being mounted in said mounting from one of the ends of the chart, and means included in said mounting for varying the concentricity of said arcuate chart with respect to the pivotal point of said responsive member.

5. In a weighing scale, in combination, load counterbalancing mechanism, a projection system, a transparent indicia-bearing member operatively connected to said load counterbalancing mechanism, a screen, the indicia borne by said member being projected onto said screen by said projecting system, said member being moved by said mechanism to position for projection by said system that one of said indicia corresponding to the load on said scale, a bracket for supporting said member from said load counterbalancing mechanism and means in said bracket to adjustably deform portions of said bracket and thereby adjust said member in both vertical and horizontal angular relation to the plane of movement of said member and said projecting system.

6. In a weighing scale, in combination, load counterbalancing mechanism including a pivotally movable member, an arcuate transparent indicia-bearing chart, a bracket mounted on said member for supporting said chart, means in said bracket for adjusting the concentricity of said chart with respect to the pivot point of said member by adjustably deforming a portion of said bracket to vary the horizontal relationship of said chart and its plane of movement and by adjustably deforming another portion of said bracket to vary the vertical angular relationship of said chart and such plane.

LAWRENCE S. WILLIAMS.